(12) United States Patent
Stefanoni

(10) Patent No.: US 10,986,953 B2
(45) Date of Patent: Apr. 27, 2021

(54) INFUSION GROUP FOR MACHINES FOR THE DISPENSING OF BEVERAGES IN THE FORM OF INFUSION

(71) Applicant: IDES DEVELOPMENT COMPANY LIMITED, Kowloon (HK)

(72) Inventor: Roberto Stefanoni, Oggiono (IT)

(73) Assignee: IDES DEVELOPMENT COMPANY LIMITED, Kowloon (HK)

( * ) Notice: Subject to any disclaimer, the term of this patent is extended or adjusted under 35 U.S.C. 154(b) by 666 days.

(21) Appl. No.: 15/518,798

(22) PCT Filed: Oct. 14, 2015

(86) PCT No.: PCT/IB2015/057861
§ 371 (c)(1),
(2) Date: Apr. 13, 2017

(87) PCT Pub. No.: WO2016/059563
PCT Pub. Date: Apr. 21, 2016

(65) Prior Publication Data
US 2017/0238752 A1    Aug. 24, 2017

(30) Foreign Application Priority Data

Oct. 14, 2014  (IT) .................. MI2014A001789

(51) Int. Cl.
*A47J 31/36* (2006.01)
*A47J 31/46* (2006.01)

(52) U.S. Cl.
CPC ......... *A47J 31/3633* (2013.01); *A47J 31/469* (2018.08)

(58) Field of Classification Search
None
See application file for complete search history.

(56) References Cited

U.S. PATENT DOCUMENTS 5,299,595 A    4/1994 Ribeiro
2006/0196363 A1    9/2006 Rahn
(Continued)

FOREIGN PATENT DOCUMENTS

WO    2013127907 A1    9/2013

OTHER PUBLICATIONS

International Search Report and Written Opinion for International Application No. PCT/IB2015/057861 (10 Pages) (dated Mar. 8, 2016).

*Primary Examiner* — Ibrahime A Abraham
*Assistant Examiner* — Elizabeth M Sims
(74) *Attorney, Agent, or Firm* — Lucas & Mercanti, LLP

(57) ABSTRACT

An infusion group for machines for the dispensing of beverages in the form of infusion is disclosed. The infusion group has a capsule-holder configured to receive a capsule for the preparation of an infusion beverage, a dispensing head adapted to cooperate with the capsule-holder to form a chamber for the infusion of the capsule. The dispensing head has a dispensing channel, a perforation disc and an associated supporting member mounted on the dispensing head. The dispensing head also has a discharge channel upstream of the dispensing channel. The configuration of the dispensing head is such that the discharge channel is closed when the perforation disc and the supporting member are in the dispensing position and open when they are in the rest position.

21 Claims, 6 Drawing Sheets

(56) References Cited

U.S. PATENT DOCUMENTS

| | | | | |
|---|---|---|---|---|
| 2011/0017071 A1* | 1/2011 | Stefanoni | ............ | A47J 31/3638 99/288 |
| 2012/0266755 A1* | 10/2012 | Baudet | ................ | A47J 31/3633 99/295 |
| 2012/0272830 A1* | 11/2012 | Gugerli | ............... | A47J 31/0668 99/295 |
| 2013/0239820 A1* | 9/2013 | Baldo | ................ | A47J 31/3633 99/295 |
| 2014/0130679 A1* | 5/2014 | Baldo | ................ | A47J 31/3633 99/295 |
| 2014/0261001 A1* | 9/2014 | Icardi | ................ | A47J 31/3633 99/295 |

\* cited by examiner

INFUSION GROUP FOR MACHINES FOR THE DISPENSING OF BEVERAGES IN THE FORM OF INFUSION

CROSS-REFERENCE TO RELATED APPLICATIONS

This application is a 371 of PCT/IB2015/057861, filed Oct. 14, 2015, which claims the benefit of Italian Patent Application No. MI2014A001789, filed Oct. 14, 2014.

FIELD OF THE INVENTION

The present invention relates to an infusion group for use in a machine for dispensing infused beverages from a disposable capsule, namely coffee, tea, herbal teas and the like.

BACKGROUND OF THE INVENTION

There are known and highly diffused several types of machines for the extemporaneous preparation of hot beverages in the form of infusion, for example coffee, tea, herbal teas and the like, from a capsule. These machines are used in offices, public places in general and recently even at home.

The capsules used in these machines, are generally disposable and single-dose containers comprising a cup shaped body containing a food product in granular or particulate form. The cup shaped body is sealed at the top by a film made of a plastic/aluminum polylaminate. The film is fixed on a flange formed along the periphery of a mouth of the cup shaped body.

A final beverage is obtained through a so-called "extraction" process, whereby a capsule is pierced at opposite ends, i.e. at the base of the cup-shaped body and on the top film, and a pressurized hot liquid, typically water, is made to flow through the cup-shaped body. Downstream of the "infusion" through the capsule the liquid makes a beverage that is dispensed to the user.

This extraction and dispensing process is carried out in a dedicated group of the machine called infusion group. The infusion group typically comprises a capsule-holder body, an infusion head having conduits and mechanisms for supplying the liquid intended to cross the capsule received in the capsule-holder body, and a dispensing head comprising further conduits allowing passage of a beverage outside the machine comprising the infusion group, where it can be collected in a container.

The infusion group must be able to:
receive a, typically disposable, capsule,
perform an infusion step,
discharge or allow to discharge an used capsule, and
be prepared to receive of a fresh capsule.

This sequence of operations is typically performed automatically through mechanisms controlled so as to cause components of the infusion group to a make relative movements coordinated with the above mentioned steps of receiving a capsule, performing infusion and ejecting the capsule.

In known machines, the infusion head makes a translation movement along a longitudinal direction of the infusion group. The infusion group comprises perforators that contact the capsule at the end of the translation movement of the infusion head and pierce it at opposite ends in the longitudinal direction in order to allow passage of an infusion liquid. The infusion head typically comprises a sharp member configured to penetrate the cup shaped body of the capsule, while the dispensing head carries a perforation disc comprising a plurality of wedge-shaped members configured to penetrate the film that typically seals the cup shaped body of the capsule.

A problem of known machines is dripping of beverage residues from the dispensing head, which occurs immediately after each dispensing step and causes fouling of the surfaces of the machine wherein the infusion group is installed. At the end of an infusion step, in fact, the pressure within the hydraulic circuit through which the infusion liquid is supplied decreases gradually, so that it is not possible to prevent the infusion liquid from flowing out of a capsule during a transitional period, and hence to continue to supply the conduits of the dispensing head, although at a very small flow rate.

SUMMARY OF THE INVENTION

On the basis of the discussion above, the technical problem underlying and solved by the present invention is to provide an infusion group for use in a machine for dispensing beverages starting from a capsule that allows to overcome the drawbacks mentioned above with reference to the prior art.

This problem is solved by an infusion group according to claim 1. Preferred features of the present invention are object of the dependent claims.

In this context the term "capsule" is to be construed in its broadest meaning to encompass any disposable or reusable receptacle capable of containing a portion of a particulate product suitable to be infused.

An idea of solution underlying the invention is to provide the dispensing head of the infusion group with a discharge or drain channel adapted to collect residues of a beverage after an infusion step, thus preventing them from flowing outside the machine wherein the infusion group is installed. It is also an idea of solution to configure the dispensing head such that opening of the discharge channel occurs in a selective manner, in particular only after every infusion and dispensing step of an infused beverage.

To this aim, the perforation disc and its supporting member on the dispensing head are movable between a dispensing position and a rest position. The discharge or drain channel is closed when the perforation disc and its supporting member are in the dispensing position and is open only when they return to the rest position at the end of the dispensing step. The capsule-holder is movable relative to the infusion head between a position wherein it is close to the dispensing head and a position wherein it contacts the latter and forms an infusion chamber with the dispensing head. The movement of the perforation disc and its supporting member relative to the dispensing head are driven by the movement of the capsule-holder relative to the infusion head.

An advantage provided by the invention is that the capsule-holder may be associated with a sealing element configured to selectively allow passage of the infusion liquid only beyond a predefined pressure threshold. Thanks to this configuration, when at the end of a dispensing step the pressure decreases below the predefined threshold, the flow of liquid towards the capsule is blocked, thus minimizing the amount of beverage that can leak from a used capsule and that is collected in the discharge channel. This contributes to minimize dripping problems.

Another advantage provided by the invention is that to the perforation disc through which an infused beverage flows may be associated with a sealing element urged by resilient means against a passage opening for the infused beverage toward a dispensing channel, the resilient means being calibrated on the basis of the dispensing pressure desired for the beverage.

BRIEF DESCRIPTION OF THE DRAWINGS

Reference will be made to the figures of the attached drawings, wherein.

DETAILED DESCRIPTION OF PREFERRED EMBODIMENTS

Figure 1:
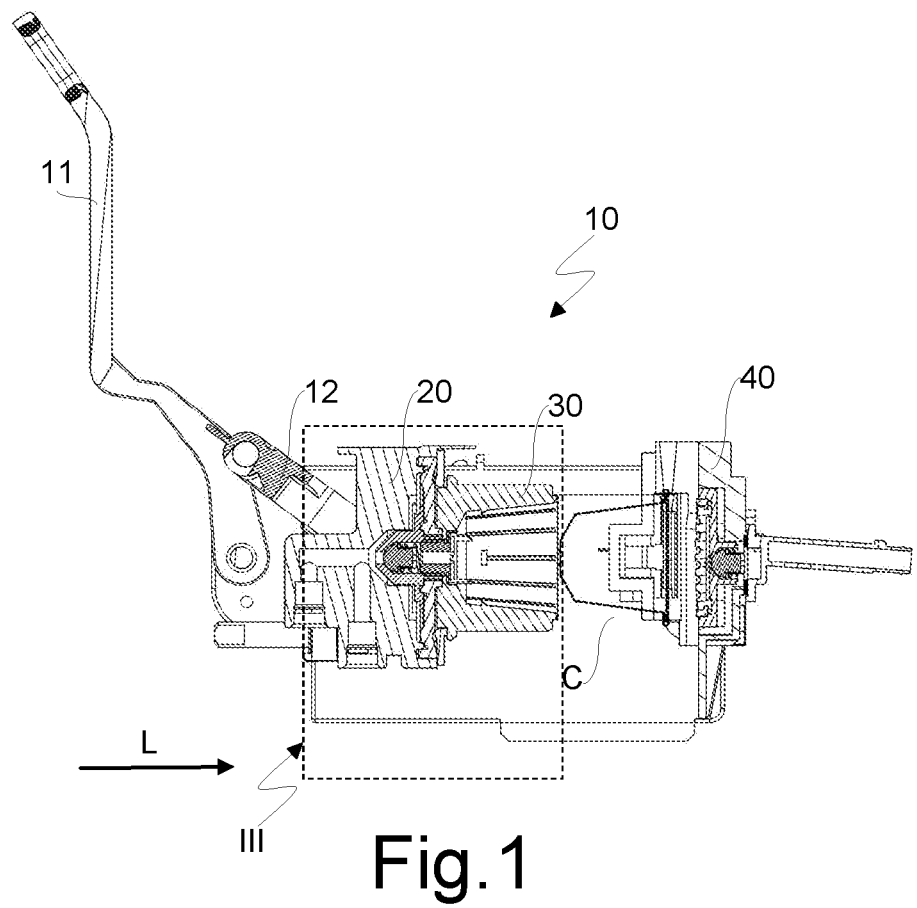
FIGS. 1 and 2 are longitudinal sectional views of an infusion group according to the invention showing the infusion group in an open configuration for receiving a capsule and in a closed configuration in which the capsule is in a capsule holder, respectively.

Referring to FIGS. 1 to 7, an infusion group according to the invention is generally marked by reference numeral 10.

The infusion group 10 comprises an infusion head 20 to which a capsule-holder 30 configured to receive a capsule C for the preparation of an infused beverage is restrained. To this aim, the capsule-holder 30 comprises a cavity 31 whose shape corresponds to and matches the shape of the cup shaped body of the capsule C.

The infusion head 20 is movable within the infusion group 10 along a longitudinal direction L, shown in the figures by way of an arrow, which corresponds to an infusion direction of the beverage, i.e. the direction of a flow of liquid through the capsule C during extraction of the beverage.

Figure 2:
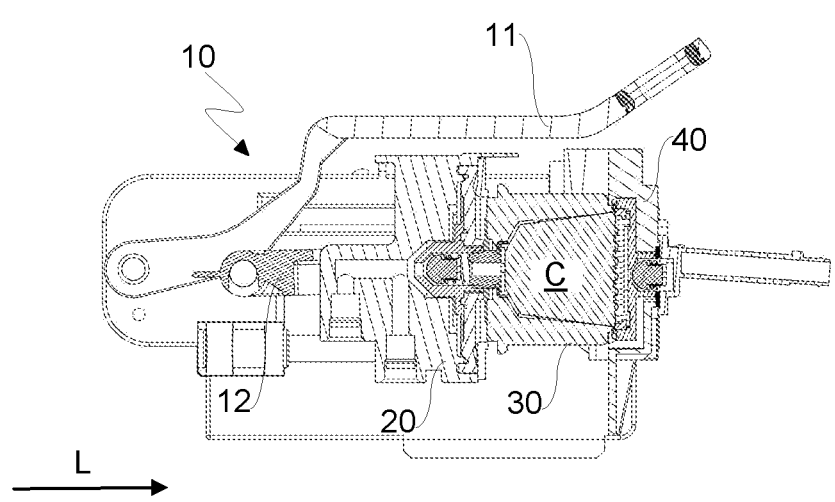

The infusion head 20 is movable between an open position of the infusion group 10, shown in FIG. 1, wherein it is retracted in the infusion group 10 thus making it possible to insert a capsule C therein, and a closed or infusion position of the infusion group 10, shown in FIG. 2, wherein the capsule C is housed in the capsule-holder 30 and is arranged and tightly sealed between the capsule-holder and a dispensing head 40, which will be described in detail later. The capsule-holder 30 and the dispensing head 40 together form an infusion chamber for the extraction of the beverage.

The infusion head 20 is operable by way of a lever 11 that can be maneuvered by a user, which is pivoted on the infusion group 10 and restrained to a connecting rod 12 in turn restrained to the infusion head 20. The lever 11 and the connecting rod 12 form a toggle linkage such as that described in Italian Patent no. 1388759 in the Applicant's name.

The toggle linkage formed by the lever 11 and the connecting rod 12 is sized so as to allow translation of the infusion head 20 and the capsule-holder 30 towards the dispensing head 40 of the infusion group 10, but not a contact among them, which occurs only during the infusion step, as it will be described in detail hereinafter. The translation movement can e.g. be calibrated so as to approach the capsule-holder 30 at approximately 1 mm from the dispensing head 40.

It will be appreciated that the toggle linkage described above is not essential in the invention, although preferred, because the closing means of the infusion group 10 could comprise a slide or similar means in an equivalent manner.

Figure 3:
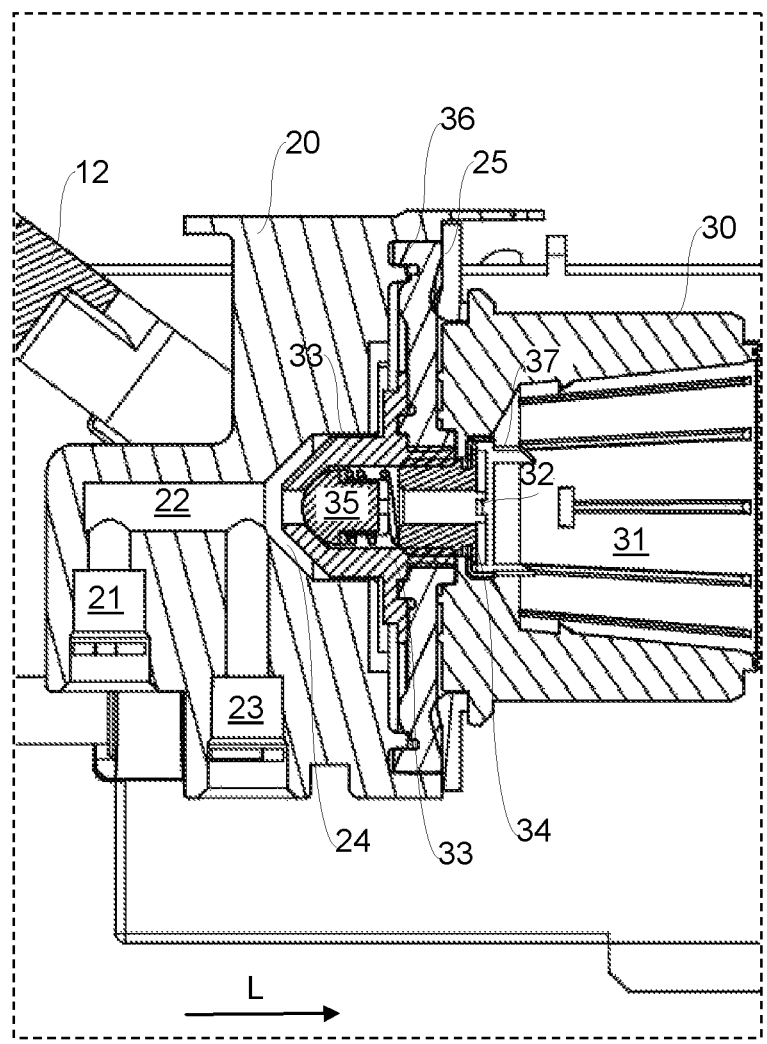
FIG. 3 shows a detail III of FIG. 1.

With particular reference to FIG. 3, an inlet conduit 21 for an infusion liquid and a supply conduit 22 are formed within the infusion head 20. The supply conduit 22 extends in the longitudinal direction L, whereas the inlet conduit 21 is arranged transversely thereto. The infusion liquid supplied through the conduit 22 enters the capsule-holder 30 through an opening 32 formed in its base in the longitudinal direction L. The infusion head 20 also comprises an outlet conduit 23, disposed transversely to the supply conduit 22, from which the liquid can be discharged at the end of the beverage infusion step.

The capsule-holder 30 is movably restrained to the infusion head 20 in the longitudinal direction L. To this aim, the capsule-holder 30 comprises a hollow body 33 which protrudes therefrom longitudinally towards the infusion head 20.

In an assembled configuration of the infusion group 10, the body 33 is slidably fitted in a cavity 24 formed in the infusion head 20, the cavity having a substantially corresponding shape, wherein an outlet of the supply conduit 22 is formed. This allows movement of the capsule-holder 30 in the longitudinal direction L.

The hollow body 33 has a through opening at each of its ends and is restrained to the capsule-holder 30 coaxially to the opening 32 by way of an axially hollow screw 34. The cavities of the body 33 and the screw 34 together form a longitudinal channel that allows to supply the infusion liquid from the supply conduit 22 of the infusion head.

Inside the hollow body 33 a sealing element 35 is slidably fitted, for example a mushroom-shaped sealing element made of rubber, which, in an assembled configuration, is pressed against the opening of the body 33 facing the infusion head 20 by way of resilient means, e.g. a spring arranged coaxially thereto. The resilient means are calibrated so as to allow passage of a flow of infusion liquid only once a predefined pressure threshold is exceeded, for example a threshold comprised between 5 and 7 bar.

The capsule-holder 30 also comprises a gasket 36 having an annular, substantially flat shape, fixed at its base coaxially to the body 33. The gasket 36 seals the base of the capsule-holder 30.

The capsule-holder 30 is mounted on the infusion head 20 by fixing the gasket 36 along the periphery at its end by way of a flange 25. The cavity 24 formed in the infusion head 20 is thus tightly closed by the gasket 36.

The overall configuration of the assembly formed by the infusion head 20 and the capsule-holder 30 is such that, during an infusion step, the liquid which proceeds in the supply conduit 22 flows into the cavity 24 thus filling the space present between the cavity and the gasket 36, the gasket being consequently deformed by the liquid pressure. By virtue of the constraints described above, the capsule-holder 30 moves forward together with the hollow body 33 and the screw 34 integral therewith in the longitudinal direction L, thus abutting the dispensing head 40 where a perforation disc 50 is mounted. As mentioned above, in this position the capsule-holder 30 defines with the dispensing head 40 an infusion chamber adapted to seal the capsule C at the flange formed around the mouth of the cup shaped body. Sealing is ensured by the flange of the capsule C, which in this condition is clamped between the capsule-holder 30 and the dispensing head 40.

Therefore, sealing of the capsule C for the extraction of a beverage does not occur upon closing of the infusion group 10 operated by the toggle linkage, but thanks to the further translation movement of the capsule-holder 30 relative to the infusion head 20, which is caused by the flow of the infusion liquid under pressure. This allows a user to close the infusion group without a high muscular effort, because the compression level required for ensuring hydraulic tightness is automatically achieved by the infusion group.

During the translation of the capsule-holder 30 relative to the infusion head piercing of the capsule C is performed in correspondence to its end contacting the perforation disc 50, as well as at the base of the cup shaped body by way of a punching member 37 arranged on the bottom of the cavity 31.

In order to achieve this relative movement, the supply pressure of the infusion liquid is maintained below the threshold. Once sealing of the infusion chamber is complete, it is possible to proceed to the infusion step, i.e. to carry out extraction of the beverage.

To this aim, the pressure of the infusion liquid is increased beyond the predefined threshold, e.g. the threshold of 5-7 bar mentioned above, so that the spring urging the sealing element 35 in the closing position is moved in the longitudinal direction L allowing passage of a flow of infusion liquid through the body 33 and the hollow screw 34, hence towards the capsule C for the extraction of the beverage.

Operation of the infusion group therefore provides for an initial closing step by approaching the capsule-holder 30 to the dispensing head 40, followed by a step of pressurization so as to ensure sealing of the infusion chamber, wherein pressure values are lower than a predetermined threshold. A subsequent infusion step carried out at a pressure higher than the threshold is also performed in order to allow extraction of the beverage.

Figure 4:
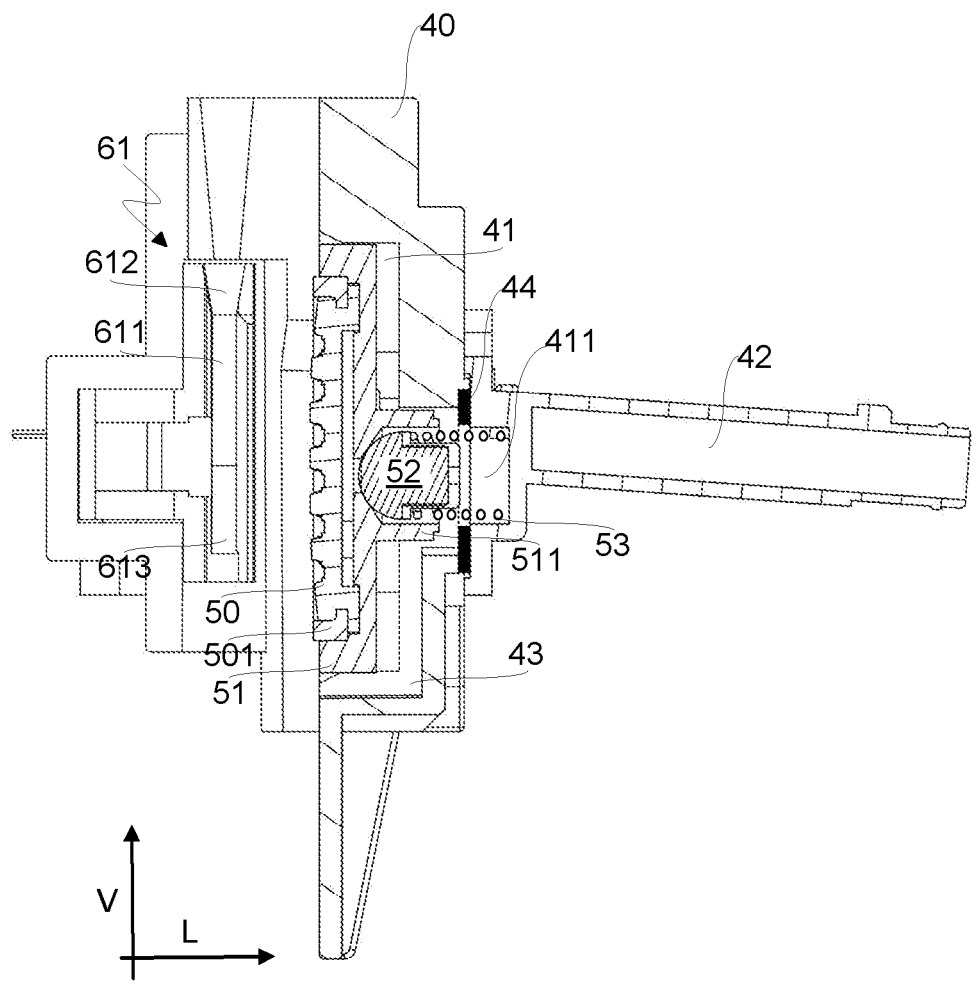
FIG. 4 is a partial, longitudinal sectional view showing a dispensing head of the infusion group according to the invention.

Now referring to FIG. 4, the perforation disc 50 is mounted on a supporting member 51 having a substantially corresponding shape that is slidably housed in the longitudinal direction L in a cavity 41 formed in the dispensing head 40. A gasket 501 is arranged between the perforation disc 50 and the supporting member 51. During use the gasket seals the perforated end of the capsule C during the infusion step of the beverage, thus preventing the latter to leak within the infusion group 10. The supporting member 51 comprises a hollow cylindrical portion 511 open at its ends, through which the beverage extracted from the capsule C can flow; the beverage is then directed toward a dispensing channel 42 of the dispensing head 40 in fluid communication with the cavity 41. The hollow cylindrical portion 511 of the supporting member 51 stretches out in the longitudinal direction L from the side opposite to the side on which the perforation disc 50 is fixed; the portion is slidably fitted in a seat 411 having a corresponding shape formed in the cavity 41.

The supporting member 51 is urged toward the capsule-holder 30 by way of resilient means such as springs.

A sealing element 52 can be advantageously housed in the portion 511, for example mushroom-shaped element made of rubber having the function to calibrate the pressure of the flow of the beverage extracted from the capsule C. For this purpose, the sealing element 52 is urged by a spring 53 arranged in the seat 411.

The dispensing head 40 also comprises a discharge or drain channel 43 that is in fluid communication with the cavity 41 and is arranged upstream of the dispensing channel 42 with respect to the longitudinal direction L, i.e. to the infusion direction of the beverage.

The discharge channel 43 has an inlet formed in the seat 411 where the portion 511 of the supporting member 51 is slidably fitted.

Figure 5:
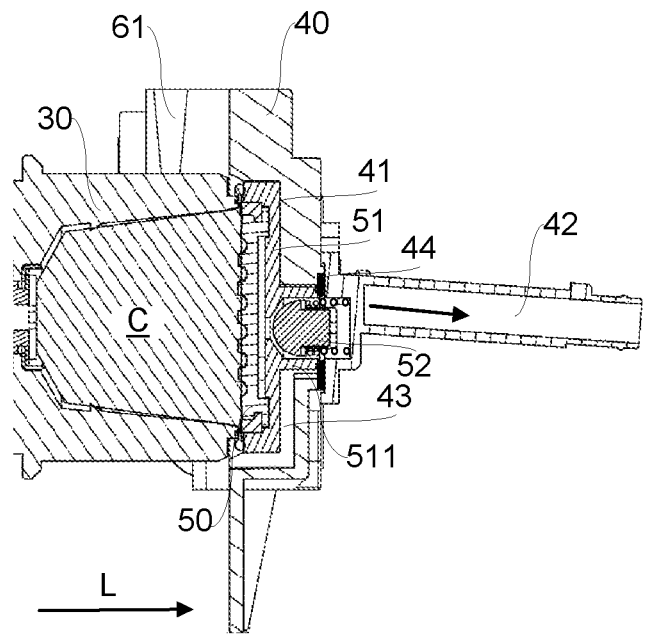
FIGS. 5 and 6 show the dispensing head of the infusion group in two operating conditions, namely when dispensing a beverage and when discharging residues of the beverage after dispensing.

In the light of the above, it will be appreciated that during the pressurization step, when the capsule-holder 30 is longitudinally moved under the effect of the pressure of the infusion liquid and contacts the perforation disc 50, the perforation disc is moved with the related supporting member 51 along the cavity 41 of the dispensing head 40. Consequently, the portion 511 slides along the seat 411 thus closing the discharge channel 43. In this condition, the whole flow of the beverage is directed towards the dispensing channel 42. In order to prevent part of the beverage from flowing into the discharge channel 43, the dispensing head 40 comprises a sealing element 44 arranged at the bottom of the seat 411; the portion 511 abuts the sealing element when it is moved under the effect of the pressure. This condition is shown in FIG. 5, wherein the flow of the beverage coming out from the infusion group 10 is schematically shown by an arrow.

When at the end of the infusion step the pressure decreases below the predetermined pressure threshold, the flow of the infusion liquid is interrupted by the mushroom shaped sealing element 35 and residues of the infusion liquid are discharged through the discharge channel 43 of the infusion head 20, which to this aim comprises a solenoid valve (not shown). Consequently, the cavity 24 closed by the gasket 36 is emptied. In this condition, the supporting member 51 of the perforation disc, urged by springs, moves the seat 411 in the direction opposite to the direction of the pressurization and infusion steps, thus causing the perforation disc 50 and the capsule-holder 30 to move in the same direction.

Figure 6:
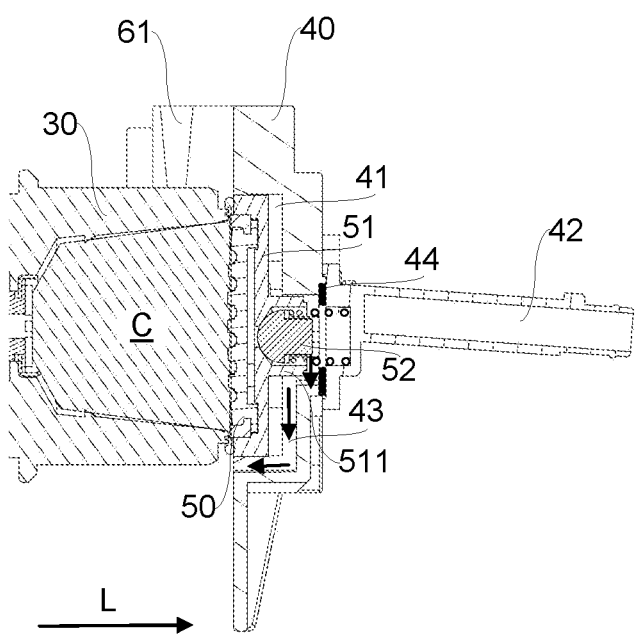
Figure 7:
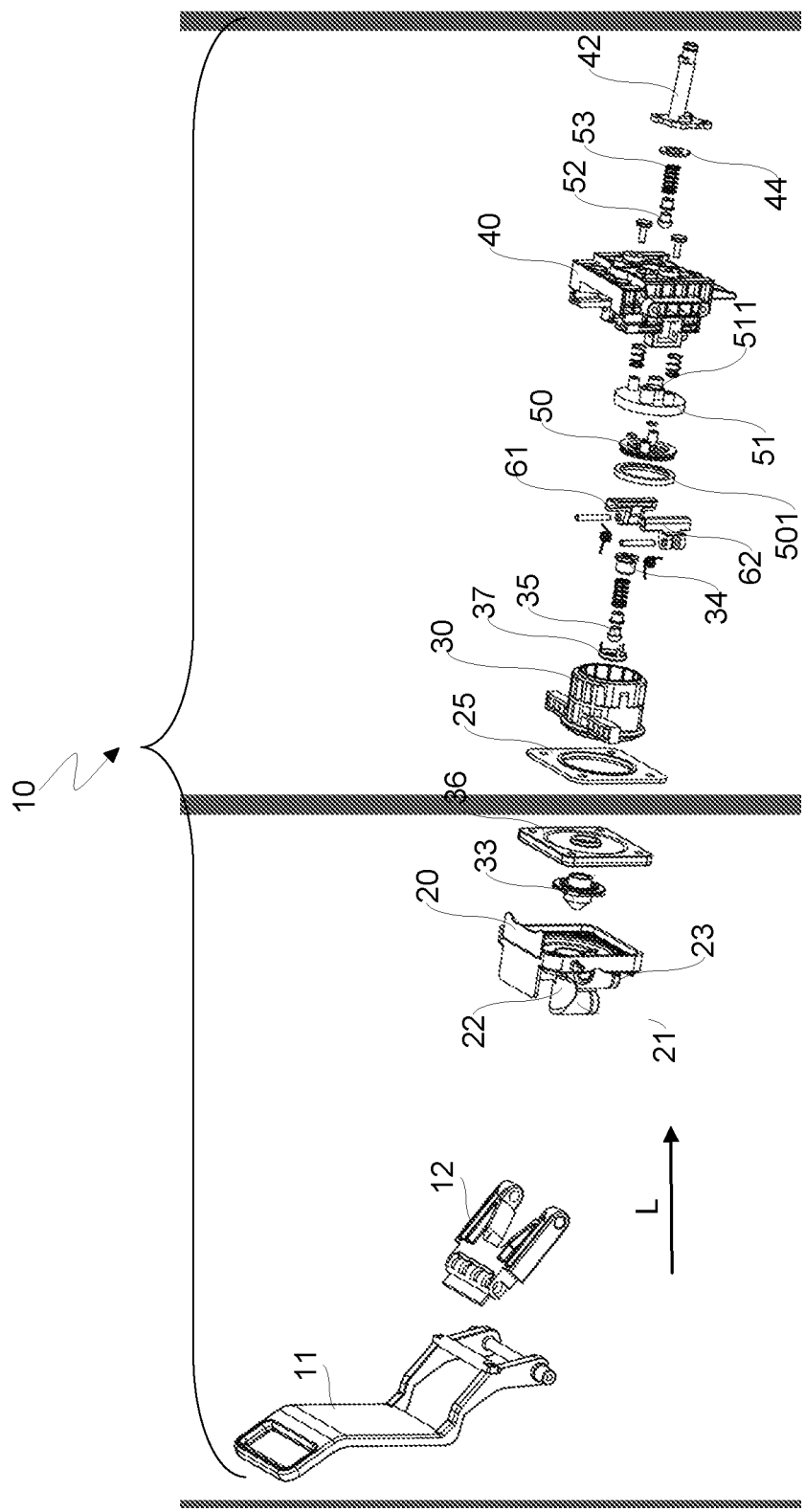
FIG. 7 is a perspective, exploded view of the infusion group according to the invention.
Figure 8:
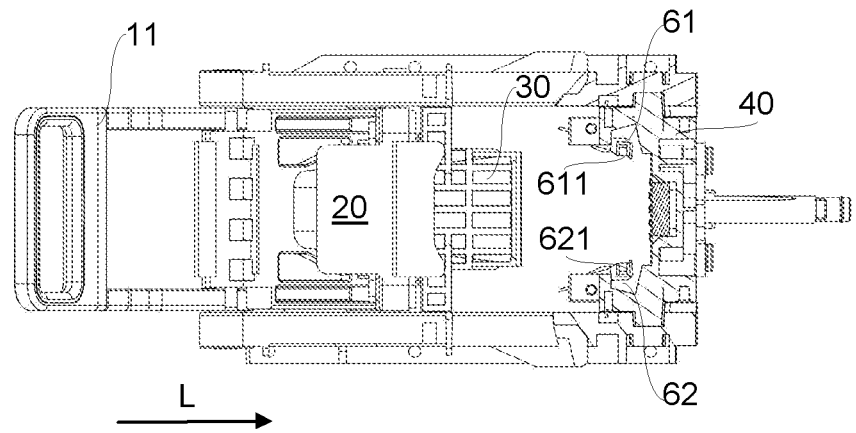
FIGS. 8 to 10 are partially sectional, top views of the infusion group according to the invention showing subsequent steps of receiving and discharging of capsule.

As shown in FIG. 6, the displacement of the supporting member 51 along the seat 411 causes opening of the discharge channel 43. Since the discharge channel is arranged upstream of the dispensing channel with respect to the longitudinal direction L, i.e. the infusion direction, this collects residues of the beverage that typically come out from the capsule C for a short time after the end of the infusion step due to effect of the pressure gradient that follows the infusion step. The flow of beverage residues through the discharge channel 43 is schematically shown by way of arrows.

The discharge channel 43 formed in the dispensing head 40 may advantageously be connected to a container for the collection of used capsules of a machine for dispensing infused beverages that is provided with the infusion group 10.

According to the invention, a capsule C for the preparation of an infused beverage is not directly fitted into the capsule-holder 30, which is moved integrally with the infusion head 20, but received by a pair of guides of the infusion group 10 associated with the dispensing head 40. The guides have the function to hold the capsule when closing the infusion group 10, i.e. when approaching the capsule-holder 30 with the infusion head 20.

With particular reference to FIG. 4 and FIGS. 8 to 10, the guides are indicated by reference numerals 61 and 62 and are arranged on the dispensing head 40 close to the perforation disc 50. The guides are arranged symmetrically with respect to a longitudinal plane of symmetry of the infusion group 10.

The guides 61, 62 extend in a vertical direction V, perpendicular to the longitudinal direction L and have respective grooves 611, 621 configured to receive the capsule C at its flange. Each guide has an open top 612, 622 suitable to receive a capsule C and a closed bottom 613, 623 suitable to limit its insertion stroke in the vertical direction V. The configuration of the guides 61, 62 is such that the capsule C is stopped in a position that is substantially aligned with the axis of the capsule-holder 30. FIG. 4 shows the portions of the guide 61, the guide 62 is completely identical thereto.

The guides 61, 62 are pivotally restrained to the dispensing head 40 about respective axes oriented in the vertical direction V. A torsion spring is associated with the axis of each guide. The torsion spring urges the respective guide in a closed or holding position of the capsule C. The arrangement of the springs is such that the guides 61, 62 are urged in rotation one toward the other, thus allowing to grip the capsule C.

Figure 9:
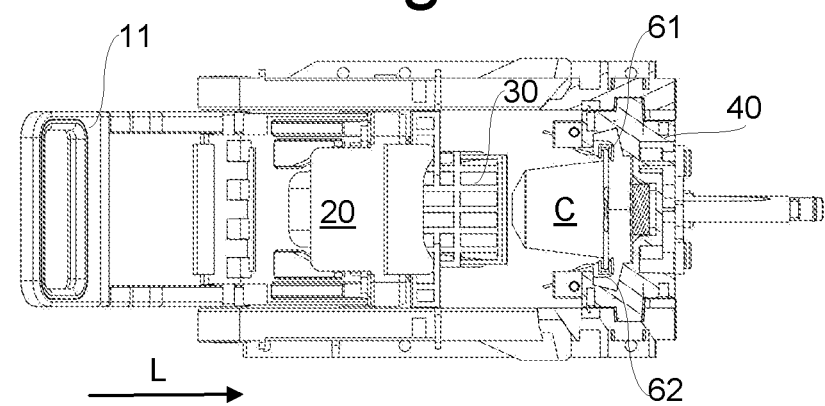

Once inserted a capsule C in the guides 61, 62 as shown in FIG. 9, when the capsule-holder 30 is moved in the longitudinal direction L by way of the toggle linkage or equivalent closing means, it meets the capsule C, which enters its cavity 31. The forward stroke of the capsule-holder 30 ends beyond the guides 61, 62 in the longitudinal direction L, so that the capsule C is eventually disengaged from the guides 61, 62, which rotate away from each other upon contact with the capsule-holder 30.

When the infusion group 10 is re-opened for the insertion of a fresh capsule, the toggle linkage 11, 12 is actuated in a direction opposite to the closing direction, thus causing the capsule-holder 30 to move back along the longitudinal direction L. As described above, it will be appreciated that the used capsule C contacts the guides 61, 62 that are urged towards each other by the respective torsion springs.

Figure 10:
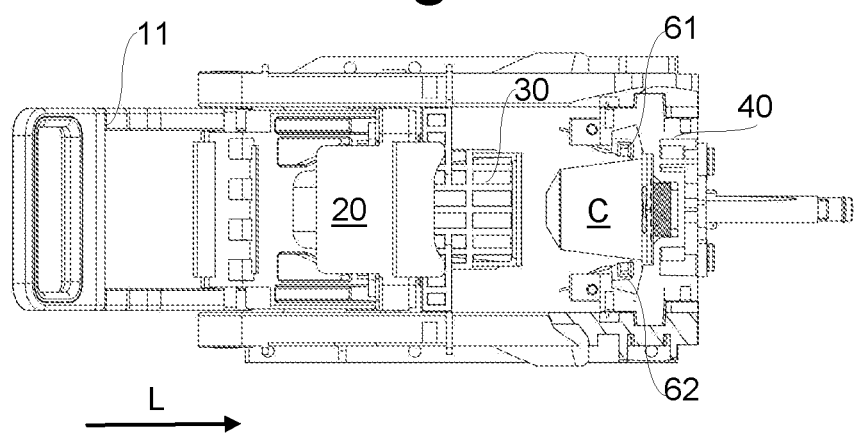

As shown in FIG. 10, during this movement the guides 61, 62 engage the flange of the capsule C thus acting as extractors and setting the capsule-holder 30 free from the capsule C. The capsule-holder is moved back in the longitudinal direction L, whereas the capsule is held between the guides and the perforation disc 50. Since there are no constraints on the retaining flange both laterally and vertically, in this position the used capsule C falls by gravity from the infusion group 10 and may be collected in a container of a dispensing machine for infused beverages wherein the infusion group is mounted, the discharge channel 43 described above being also connected to the same container.

The present invention has hereto been described with reference to preferred embodiments thereof. It is to be understood that there may exist other embodiments relating to the same inventive idea as defined by the scope of protection of the claims set forth below.

The invention claimed is:

1. An infusion group for machines for the dispensing of beverages in the form of infusion, said infusion group comprising:
    i) a capsule-holder configured to receive a capsule (C) for the preparation of a beverage in the form of an infusion,
    ii) a dispensing head adapted to cooperate with said capsule-holder to form a chamber for the infusion of said capsule (C), said dispensing head comprising a dispensing channel,
    a perforation disc and a supporting member associated with said perforation disc, said supporting member being mounted in said dispensing head, and:
    said dispensing head also comprises a discharge channel, said discharge channel being arranged upstream of said dispensing channel with respect to a longitudinal direction (L) along which a beverage is dispensed, said discharge channel being arranged downstream of said perforation disc with respect to said longitudinal direction,
    the perforation disc and the supporting member are movable relative to the dispensing head between a dispensing position and a rest position, wherein the perforation disc and the supporting member are slidably housed in the longitudinal direction in a cavity formed in the dispensing head, wherein the inlet of the discharge channel is formed in the cavity between the perforation disc and the dispensing channel,
    the configuration of the dispensing head being such that the discharge channel is closed when the perforation disc and the supporting member are in the dispensing position and open when they are in the rest position.

2. The infusion group according to claim 1, wherein said capsule-holder is movable along said longitudinal direction (L) at least between an approaching position wherein said capsule-holder is close to the dispensing head and a closed position wherein said capsule-holder abuts the dispensing head and forms said infusion chamber therewith.

3. The infusion group according to claim 2, wherein said movement of the perforation disc and the supporting member relative to the dispensing head is driven by the movement of the capsule-holder.

4. The infusion group according to claim 2, wherein the capsule-holder is mounted on an infusion head slidable along said longitudinal direction (L) and wherein said capsule-holder is movable relative to said infusion head between said approaching and closed positions.

5. The infusion group according to claim 4, wherein the capsule-holder comprises a hollow body that protrudes therefrom in the longitudinal direction (L) towards the infusion head, said hollow body being slidably fitted in a cavity formed in the infusion head wherein the outlet of a conduit for the supply of an infusion liquid is arranged, and wherein the capsule-holder further comprises a gasket having a substantially flat annular shape, said gasket being fixed between the capsule holder and the hollow body, the capsule-holder being mounted on the infusion head by fastening said gasket with a flange, whereby the cavity formed in the infusion head is sealed by the gasket.

6. The infusion group according to claim 5, wherein the hollow body has a through opening at each end and is restrained to the capsule-holder coaxially with an inlet opening for the infusion liquid by way of a screw, said screw being axially hollow, and wherein the cavities of the hollow body and the screw together form a longitudinal channel that allows feeding of the infusion liquid from the supply conduit of the infusion head to the capsule-holder.

7. The infusion group according to claim 5, wherein a sealing element is slidably fitted inside the hollow body, said sealing element being urged by resilient means against the opening of the hollow body facing the infusion head, said resilient means being configured to yield in the longitudinal direction (L) beyond a predetermined pressure threshold so as to allow passage of a flow of infusion liquid.

8. The infusion group according to claim 4, further comprising closing means, said closing means being operatively connected to said infusion head.

9. The infusion group according to claim 8, wherein said closing means comprise a toggle linkage, said toggle linkage being made up of a lever pivoted on the infusion group and of a connecting rod connected between the lever and the infusion head, the configuration of said linkage being such that in the closed position of the infusion group the capsule-holder is located in proximity of the dispensing head but is not in contact therewith.

10. The infusion group according to claim 1, wherein the supporting member comprises a cylindrical portion that is hollow and open at its ends so as to allow a flow of a beverage extracted from the capsule (C) towards the dispensing channel, and wherein said hollow cylindrical portion is slidably housed in a seat having a corresponding shape formed in the cavity of the dispensing head.

11. The infusion group according to claim 10, wherein the supporting member of the perforation disc is urged towards the capsule-holder by resilient means arranged in the cavity of the dispensing head.

12. The infusion group according to claim 11, wherein a sealing element is fitted in the hollow cylindrical portion, said sealing element being urged against an opening for the passage of a beverage extracted from the capsule (C) by way of resilient means.

13. The infusion group according to claim 10, wherein the dispensing head comprises a sealing element arranged on the bottom of the seat intended to receive in abutment the portion of the supporting member of the perforation disc.

14. The infusion group according to claim 1, wherein the dispensing head further comprises a pair of guides configured to receive a capsule (C) in a vertical direction (V) perpendicular to the longitudinal direction (L), and to hold it during the closing phase of the infusion group.

15. The infusion group according to claim 14, wherein said guides are restrained to the dispensing head proximate to the perforation disk and are arranged symmetrically with respect to a longitudinal symmetry plane of the infusion group.

16. The infusion group according to claim 14, wherein the guides comprise respective grooves configured to receive a capsule (C) in correspondence to its flange, as well as respective open top ends suitable for allowing insertion of the capsule (C) and respective closed ends suitable to limit movement of capsule (C) in the vertical direction (V).

17. The infusion group according to claim 14, wherein the guides are pivotally restrained to the dispensing head about respective axes arranged in the vertical direction (V), and wherein the axis of each guide is associated with a torsion spring that urges the respective guide in a closed position, or retaining position, of the capsule (C), the arrangement of the springs being such that the guides are urged to rotate towards each other.

18. The infusion group according to claim 17, wherein a portion of the capsule-holder is located at a position between the guides and the surface of the dispensing head on which the perforation disc is located.

19. A machine for dispensing beverages in the form of an infusion, further comprising an infusion group according to claim 1.

20. The machine according to claim 19, wherein the discharge channel of the dispensing head of the infusion group is in fluid communication with a collection tray adapted to receive used capsules (C) discharged from the infusion group.

21. An infusion group for machines for the dispensing of beverages in the form of infusion, said infusion group comprising:
  i) a capsule-holder configured to receive a capsule (C) for the preparation of a beverage in the form of an infusion,
  ii) a dispensing head adapted to cooperate with said capsule-holder to form a chamber for the infusion of said capsule (C), said dispensing head comprising a dispensing channel,
  iii) a perforation disc and a supporting member associated with said perforation disc, said supporting member being mounted in said dispensing head, and
  said dispensing head also comprises a discharge channel, said discharge channel being arranged upstream of said dispensing channel with respect to a longitudinal direction (L) along which a beverage is dispensed, said discharge channel being arranged downstream of said perforation disc with respect to said longitudinal direction,
  the perforation disc and its supporting member are movable relative to the dispensing head between a dispensing position and a rest position, wherein the perforation disc and its supporting member are slidably housed in the longitudinal direction in a cavity formed in the dispensing head, wherein the inlet of the discharge channel is formed in the cavity between the perforation disc and the dispensing channel,
  the configuration of the dispensing head being such that the discharge channel is closed when the perforation disc and the supporting member are in the dispensing position and open when they are in the rest position,
  wherein the capsule-holder comprises a hollow body that protrudes therefrom in the longitudinal direction towards the infusion head, said hollow body being slidably fitted in a cavity formed in the infusion head wherein the outlet of a conduit for the supply of an infusion liquid is arranged,
  and wherein a sealing element is slidably fitted inside the hollow body, said sealing element being urged by resilient means against the opening of the hollow body facing the infusion head, said resilient means being configured to yield in the longitudinal direction beyond a predetermined pressure threshold so as to allow passage of a flow of infusion liquid.

* * * * *